United States Patent [19]

Jeck et al.

[11] Patent Number: 5,473,958
[45] Date of Patent: Dec. 12, 1995

[54] SPINDLE DRIVE FOR AN ADJUSTING MECHANISM FOR VEHICLE SEATS

[75] Inventors: Horst Jeck, Drollshagen; Hans G. Menne, Bergneustadt, both of Germany

[73] Assignee: Alfred Teves, GmbH & Co., OHG, Germany

[21] Appl. No.: 162,108

[22] PCT Filed: May 9, 1992

[86] PCT No.: PCT/EP92/01020

§ 371 Date: Dec. 10, 1993

§ 102(e) Date: Dec. 10, 1993

[87] PCT Pub. No.: WO92/22439

PCT Pub. Date: Dec. 23, 1992

[30] Foreign Application Priority Data

Jun. 14, 1991 [DE] Germany ............... 41 19 610.4

[51] Int. Cl.⁶ .................................................. F16H 29/02
[52] U.S. Cl. ............................ 74/89.15; 248/429; 384/34
[58] Field of Search ..................... 74/89.15; 248/424, 248/429; 384/34, 42, 47; 297/344.1

[56] References Cited

U.S. PATENT DOCUMENTS 4,838,511 6/1989 Terada et al. .

FOREIGN PATENT DOCUMENTS

| 3521836 | 1/1987 | Germany . |
| 3725158 | 2/1988 | Germany . |
| 3919378 | 12/1989 | Germany . |
| 3112729 | 5/1991 | Japan . |
| 2151132 | 7/1985 | United Kingdom . |

*Primary Examiner*—Charles A. Marmor
*Assistant Examiner*—Chong H. Kim
*Attorney, Agent, or Firm*—Robert P. Seitter; J. Gordon Lewis

[57] ABSTRACT

A spindle drive for a vehicle seat connected with an upper rail. According to this invention, an upper rail slides on the surface of a drive nut preferably made of plastic whose internal thread is engaged by the spindle. Advantageous further developments deal with improving the longitudinal guidance of the upper rail on the drive nut as well as with preventing the upper rail from radially moving away from the drive nut.

38 Claims, 3 Drawing Sheets

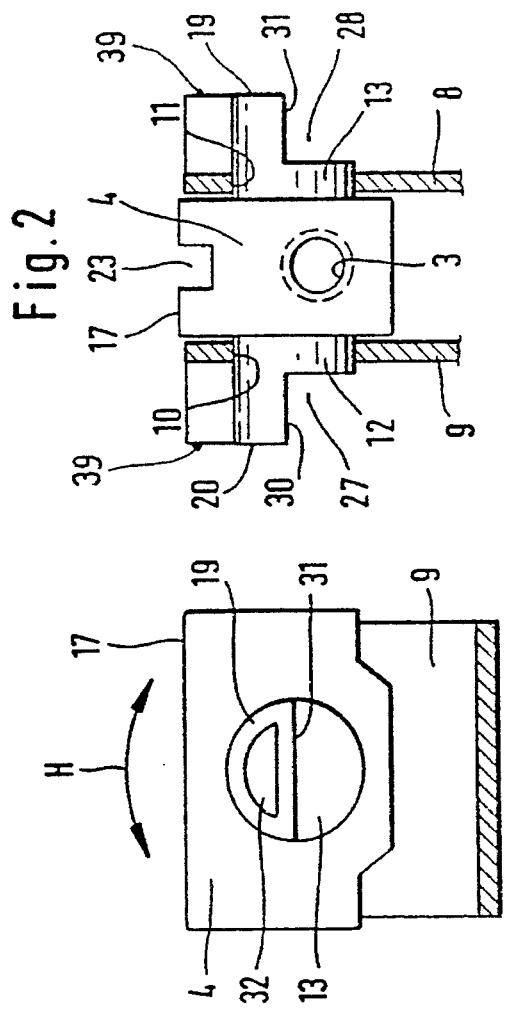
Fig. 2
Fig. 3
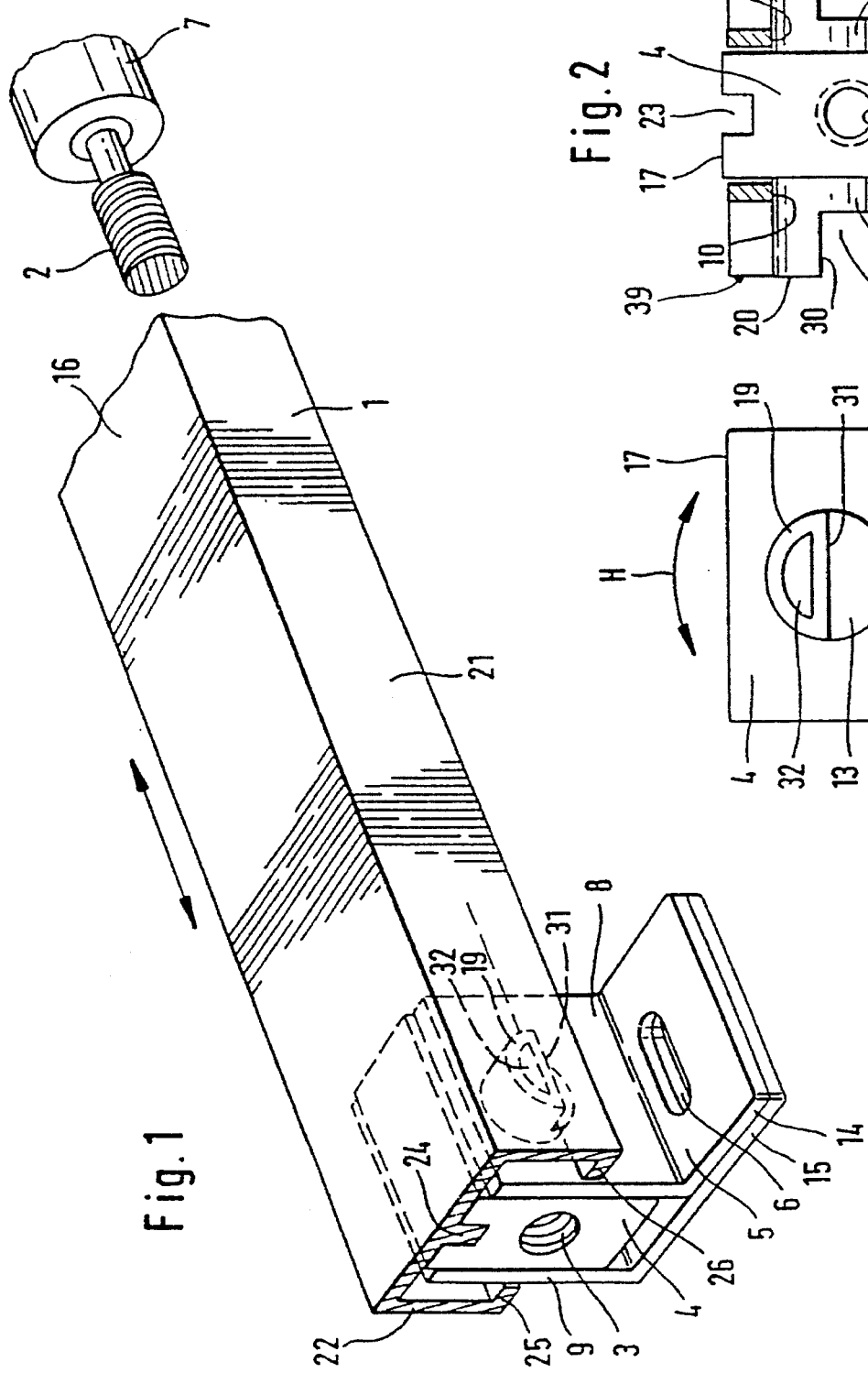
Fig. 1

SPINDLE DRIVE FOR AN ADJUSTING MECHANISM FOR VEHICLE SEATS

BACKGROUND OF THE INVENTION

This invention relates to a spindle drive for an adjusting mechanism for vehicle seats. Such a drive is known, for instance, from DE-OS (German Patent Application) No. 37 25 158. In this literature of reference, a rail firmly connected with the vehicle seat is driven via a rotating spindle which, in the axial direction, is firmly connected with the seat. The drive is effected through a regulating unit which makes the spindle rotate, with the rotation of the spindle being transformed into a longitudinal motion of the seat.

From DE-OS (German Patent Application) No. 39 19 398 it is known to provide a vehicle seat adjusting mechanism with a drive formed fast with the vehicle whereon a rotating spindle connected with the seat supports itself and which thus, by means of its rotation, moves the seat in its longitudinal direction.

SUMMARY OF THE INVENTION

This invention thus proceeds from an adjusting mechanism of the type for a vehicle seat including a spindle engaging a drive nut to move the vehicle seat. It is an object of this invention to simplify the known design of such a spindle drive and to improve it, in particular with regard to the guidance of the upper rail as well as with regard to a protection against any possible tilting of the seat guideway relative to the guideway parts formed fast with the vehicle.

Thus, on principle, this invention consists in simultaneously using the drive nut, held fast to the vehicle, also for guiding the upper rail of the seat. This provides the possibility to improve and simplify the guideway of the upper rail.

A particularly effective support of the upper rail and, thus, of the seat will be achieved via the drive nut, the seat being supported in the vertical direction, i.e., in the direction of the biggest load.

A considerably improved guiding behavior will be achieved between the drive nut and the upper rail by means of longitudinal recesses and projections thereon which form a guideway for the upper rail in the longitudinal direction of the spindle. Thereby, the upper rail will be largely prevented from being displaced sideways, i.e., in the direction transverse to the longitudinal axis of the spindle. Thus, the drive nut not only will take care of conveying the seat in the longitudinal direction of the spindle but will additionally take care of receiving the load of the seat in the horizontal direction as well as of guiding the upper rail in the lateral direction.

It is recommended to use a guide rail in the upper rail which runs in the longitudinal direction of the upper rail and which plunges into a longitudinal groove in the drive nut if the action of the lateral guidance of the drive nut is to be symmetrical. The additional advantage of such a type of guidance lies in that the cross-sectional surface of the rail guided in the groove is relatively small as compared with the cross-sectional surface of the drive nut itself so that the thus created guideway system is likewise relatively indifferent to temperature variations, in particular to a strong change in temperature. This particularly applies to the dimensions in the lateral direction.

In developing this invention further, the guide rail can be connected with the upper rail in one piece. This can be done by means of a cupping process, by means of casting or by means of extrusion.

However, the rail may also be of a separate material, in particular of a slidable material which furthers and supports the sliding properties of the upper rail on the drive nut.

A particularly simple design is rendered by having the guide rail essentially extending over the entire length of the upper rail and slidingly projecting into a corresponding recess of the drive nut. The guide rail can be of a separate slidable material improving the slidability of the upper rail on the drive nut.

If the guideway is subjected to less heavy use it is also possible to use a combination of characteristics in which the drive nut has a projection which may be connected firmly with the nut or even may be formed in one piece with it and which engages a corresponding longitudinal groove of the upper rail, thus guiding the same. In order to improve the sliding properties of the drive it is possible to manufacture the drive nut of a slidable plastic material so that this part of the guideway system will not require separate greasing. Such a drive nut has the further advantage of being manufacturable at relatively low cost even in case of a more complicated design.

In order to save weight upon manufacturing the seat it is possible to form the drive nut of plastic and the upper rail of aluminum. In accordance therewith, it is in particular the sliding properties of the plastic that are of importance in a drive nut made of plastic material. The guiding properties of the inventive design also make themselves most excellently noted in an aluminium rail as, due to the relatively small width of the guideway, the effects of the different shrinkage properties of the two materials deviating from each other will be less embarrassing in case of major temperature differences.

In developing this invention further, the nut is rotatably supported in the horizontal and transverse direction to the longitudinal axis of the spindle is recommended if the upper rail is swivelling horizontally—for example, due to a corresponding sequence of motions during its axial motion or else, because of a swivelling motion permitted for the seat surface in the rest condition.

It is possible to adapt the abutment surface of the drive nut in a simple manner to the varying angle of inclination of the upper rail.

An additional lateral support of the upper rail is achievable by means of front faces of pivots supported on side walls of the upper rail. Thereby, the free ends of the comparatively strong pivots are additionally made use of so as to receive forces which are essentially horizontal and which are transverse to the longitudinal axis of the spindle and to divert them into the bottom of the motor vehicle via the support of the drive nut. In doing so, however, it will have to be taken into consideration that the tolerance-ratings between the ends of the pivots and the side walls of the upper rail will not be too close as in case of low temperatures the upper rail will undergo a considerable shrinkage, particularly so if it is of aluminium, so that then the seat may be given to jamming. On the other hand, with this required wide tolerance-rating it is to be feared that there will be an expansion in the lateral dimensions of the rail in case of high temperatures, thus a considerable play existing between the pivots and the adjacent side walls of the upper rail. This may cause an embarrassing drawer effect in that the upper rail will tilt in respect of the guide surfaces of the drive nut. In this case, the inventive design's guiding properties are extremely valuable as they are largely indifferent to temperatures due to the little expansion of these guideways.

In developing this invention advantageously further, it is possible, to use suitable measures in order to prevent the upper rail from being lifted out vertically upwards relative to the drive nut. Horizontally extending projections of the upper rail reach behind corresponding projections of the drive nut, in particular behind the pivots projecting in the horizontal directions. These projections preferably extend over the entire motion travel of the upper rail or over its entire length.

It is also possible by the present invention to enlarge the abutment surfaces of the pivots for the projections and in order to improve the guiding behavior of the drive nut relative to swivelling motions of the upper rail. Thus an enlarged abutment surface of the projections will be achieved on the pivots while, otherwise, the pivots would only have a line-shaped contact with the projections.

An additional safety measure against any undesired vertical motion of the upper rail, such as in case of an accident, can be achieved by means of safety lugs which are shaped to project horizontally out of the cage and which, if the case may be such, engage the projections of the upper rail, with the effective surface of these lugs as a rule lying above the effective surface of the pivots relative to the rail projections. In the normal case, the projections are slidingly guided in this way on the pivots which, in many cases, are of plastic. However, if these plastic pivots are torn out during an accident the safety lugs on the cage will become effective relative to the projections moving vertically upwards. Preferably, these safety lugs will be shaped in one piece out of the steel cage.

The cage itself will receive a particularly simple and inexpensive design in which the cage is formed of two parts, one of which is fastened to the vehicle bottom. Thereby, the assembly of the nut into the cage will become relatively simple by way of inserting the pivot of a nut into a corresponding opening of the one part of the cage, subsequently the corresponding opening of the second cage part being sled onto the opposite pivot and, thereupon, the second cage part being connected with the first one. A further simplification with regard to the cage can be achieved by shaping one side surface of the cage out of a lower rail, with the lower rail not absolutely having to extend over a major part of the possible motion travel of the upper rail. It will be sufficient to provide some individual posts projecting into the upper rail so as to serve as a guide and to support the upper rail.

BRIEF DESCRIPTION OF THE DRAWINGS

In the following, one example of an embodiment of this invention will be explained, reference being made to the drawing, wherein:

FIG. 1 shows the broken-off, perspective and—in part—symbolical representation of the type of fastening of the upper rail on the drive nut arranged in the cage;

FIG. 2 shows, in partial section, the representation of the nut arranged in the side walls of the cage as seen in the longitudinal direction of the spindle;

FIG. 3 shows the drive nut fixed to the one part of the cage, with the second cage part being left away for the sake of an enhanced clarity;

DESCRIPTION OF THE PREFERRED EMBODIMENTS

Figure 4:
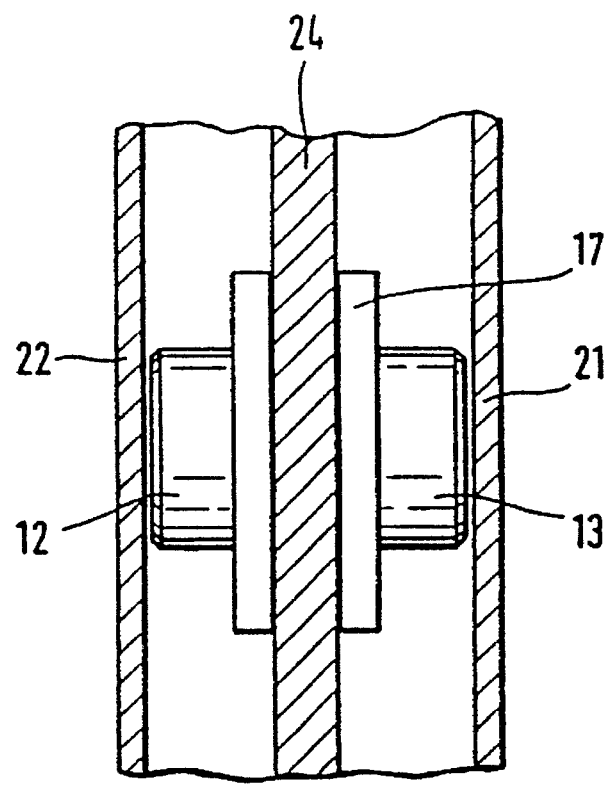
FIG. 4 shows a section above the drive nut through the upper rail in the horizontal direction, with the cage being left away which holds the nut from below.

FIG. 1 shows an upper rail 1 in respect of which (not illustrated in the drawing) a spindle 2 provided with an external thread is rotatably supported, yet not axially displaceably. Thus, the upper rail 1 follows a longitudinal motion of the spindle 2. The spindle 2 penetrates through a drive nut 4 provided with an internal thread 3 and supported in a cage 5 hereinafter often denominated as a nut holder. The cage 5 is bolted to the bottom of an automotive vehicle in that a corresponding bolt penetrates through the elongated hole 6 and engages the bottom of the vehicle.

The internal thread 3 of the drive nut 4 engages the external thread of the spindle 2 so that, upon a rotation of the spindle 2, the nut 4 formed fast with the vehicle exerts a kinetic force on the spindle 2, thereby the same being moved in its longitudinal direction and—in doing so—carrying along the upper rail 1 together with the vehicle seat. A gear unit 7 connected with the spindle or a manual drive which may be fastened to the vehicle seat may serve the performance of a rotary motion through the spindle.

FIG. 2, in sectional position, shows two side surfaces 8 and 9, one of which can be lower rail, of the cage 5 which have two circular openings 10 and 11 penetrated by two essentially cylinder-shaped pivots 12 and 13 connected with the drive nut 4 in one piece. Thereby, the nut 4 is rotatably supported in the openings 10, 11 of the cage 5. Safety lugs 39 are shown schematically in FIG. 2 with respect to the cage 5.

The cage itself is composed of two cage parts 14, 15 undetachably joined together by means of welding, riveting or some other type of connection after the nut has been introduced between the side surfaces 8 and 9 of the right-angled cage parts 14, 15.

FIG. 3 shows the cage part 15 without the front cage part 14 and without the upper rail 1, yet with the nut 4 inserted into the opening 10. The double arrow H is to indicate the rotatability of the nut 4 within the circular opening 10.

With regard to the mode of operation of this invention it now is very important that the upper rail 1 rests with the lower surface of its mid-section 16 of FIG. 1 on the abutment surface 17 of the nut 4 and thus transmits a force acting vertically on the mid-section 16 to the abutment surface 17 and, via the pivots 12, 13 as well as via the cage 5, to the bottom of the vehicle. Because of the design of the nut 4 so as to be of plastic the upper rail 1 will slide in a comparatively easy way, without being greased, on the abutment surface of the nut 4.

Further, it is important for the inventive design that the side walls 21, 22 adjacent to the mid-section 16 support themselves on the front faces 19, 20 of the pivots 12, 13 so that the upper rail 1 will be guided by the nut 4 also transversely to the longitudinal axis of the spindle. In this respect attention will have to be paid to the fact that, in case of high temperatures, a comparatively large play D (see FIG. 7) will be required between the front faces 19, 20 of the pivots 12 and 13 and the inside surfaces of the side walls 21, 22 of the upper rail 1 so as to prevent the side walls 21, 22 from getting jammed in respect of the nut 4 in case of very low temperatures. This will in particular be the case if the nut 4 inclusive of the pivots is exclusively made from plastic, the upper rail 1 being made of aluminium since in such a case the temperature expansion behavior of the two materials is very different. Moreover, the distance of the two side walls 21, 22 is comparatively large so that the shrinkage processes will make themselves felt even more noticeably.

In order to achieve a better guidance in this respect, a longitudinal through groove has been inserted into the abutment surface of the nut 4 in the longitudinal direction of the spindle wherein a guide rail 24 is sliding with comparatively narrow tolerance-rating. The guide rail 24 may be a projection essentially extending over the entire length of the upper rail 1 and formed in one piece together with the same so that the guide rail 24 is formed together with the upper rail 1 when the same is extruded or cast and will not need a separate working operation.

Figure 6:
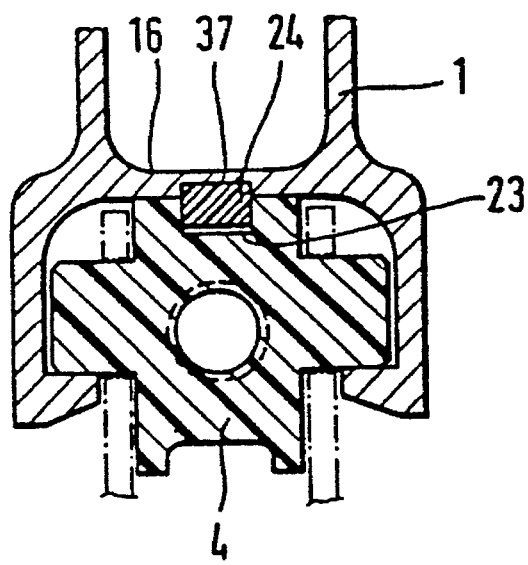
FIG. 6 shows a section on the same level through a second embodiment of the spindle drive.

However, as can be seen from FIG. 6, it also may be a separate part which, for instance, is inserted permanently into a corresponding groove 23 of the nut 4 and is connected with the same in a comparatively firm manner. Thus, the guide rail 24 will slide in the longitudinal groove 23 of the nut 4. Such a design will be of particular advantage when a special material is to be used for the guide rail so as to simplify the tolerance-rating, for instance. It is the particular duty of the guide rail 24 to prevent the upper rail 1 from jamming (drawer effect) in respect of the front faces 19, 20 of the nut 4 which, otherwise, might easily happen due to the large tolerance distance D (see, e.g., FIG. 7).

Figure 5:
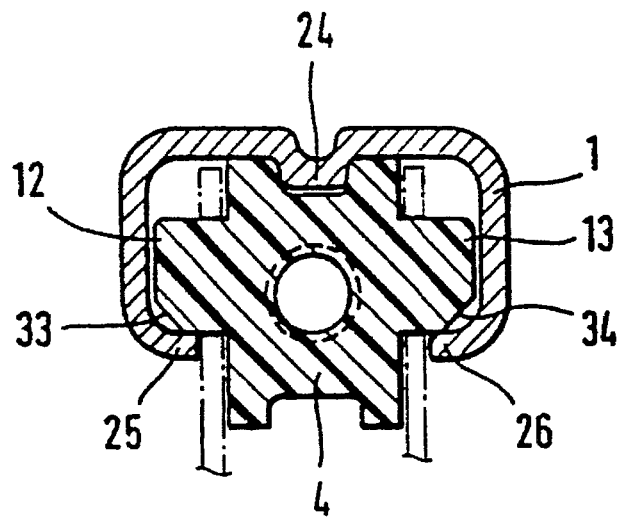
FIG. 5 as seen in the longitudinal direction of the spindle, shows a section through a first embodiment of the spindle drive.

FIG. 5 largely coincides with the design of FIG. 7, with the exception of the projection 24 not being shaped by means of extrusion or casting (as is possible with aluminium) so as to form one piece with the upper rail 1, such as is the case in FIG. 7, but—by means of a drawing process—is subsequently shaped out of an upper rail 1 preferably made of steel.

For the further development of this invention it is also important that the projections 25, 26 which— for example, in FIG. 4—extend horizontally from the side walls 21, 22 towards the central plane of the upper rail 1 and preferably run over the entire length of the upper rail 1. As can be seen from FIGS. 1 and 5 through 7, these projections 25, 26 reach behind the peripheries of the pivots 12, 13, thus preventing the upper rail from being lifted upwards (e.g., FIG. 5) even in case of strong vertical forces (an accident), since the pivots will prevent any such motion.

In particular in such cases when the nut 4—as described further above—is rotatably supported in the cage 5 it is recommendable to enlarge the abutment surfaces of the projections 25, 26 on the pivots 12, 13. This is done, for instance, in that—as can be seen in particular from FIGS. 1 through 3—the pivots have a rectangular recess 27, 28 which provide wide abutment surfaces 30, 31 whereon the abutment surfaces of the projections 25, 26 may support themselves. In FIG. 1 as well as in FIGS. 2 and 3 the widened abutment surface 31 is sketched out; the broken-line-type representation in FIG. 1 is to indicate that this surface lies invisibly behind the side wall 21 of the upper rail 1.

In order to generate a higher elasticity of the pivots, the same are provided with circular-sector-shaped impressions 32 pointing towards the longitudinal axis of the pivot and, as explained with reference to FIG. 1, lying behind the side wall (21), thus not being visible when the upper rail is mounted.

As the rail 1 of FIG. 5 which was formed by way of cupping does not permit the projections 25, 26 to be attached at right angles to the side walls 21, 22, to this end—over the length of the nut—a section 33, 34 was cut off from each of the pivots 12, 13 of the nut 4.

Figure 7:
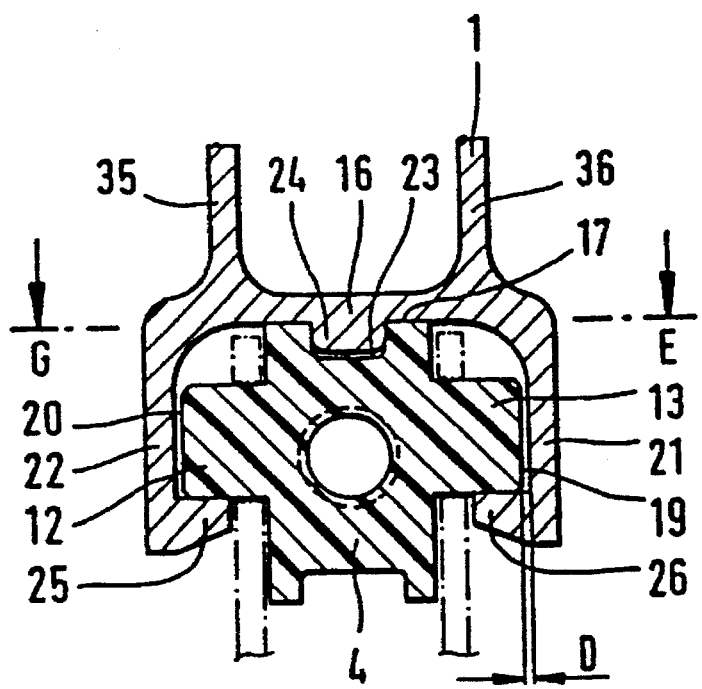
FIG. 7 shows a section through a third embodiment of the inventive spindle drive.

In FIG. 7, vertically upwards projecting projections 35, 36 serve an improved type of fastening of the automotive vehicle seat.

FIG. 4 shows a section on the level of line G–E of FIG. 7, in this section the guide rail 24 and the side walls 21, 22 are discernible.

The design of the lateral guidance by means of the guide rail 24 or rather by means of the recess may be varied within the scope of this invention by means of a different type of shape, for instance, by using a plurality of rails and grooves or by changing their profiles.

On principle, it is also possible to switch the functions of the drive nut and the spindle in that the spindle and the rail will be firmly mounted with regard to the vehicle bottom and in that the nut will move together with the seat.

What is claimed is:

1. A spindle drive for an adjusting mechanism of a vehicle seat including a spindle (2) supported on an upper rail (1), connected with a seat cushion, where the spindle engages a drive nut (4) supported in respect of the vehicle bottom, with the spindle rotation caused by a drive (7) moving the upper rail (1) and the vehicle seat in the longitudinal direction of the spindle, characterized in that the upper rail (1) is guided in an axially sliding manner on the abutment surface (17) of the drive nut (4), where the drive-nut (4) abutment surface (17) and the upper-rail (1) inside surface, which seats itself on the same, have recesses (23) and projections (24), respectively, which correspond to one another, and which extend in the longitudinal direction of the spindle, to form a guideway for the upper rail (1) in the longitudinal direction of the spindle (2).

2. A spindle drive as claimed in claim 1, characterized in that the upper rail (1) is supported on the abutment surface (17) of the nut (4) in essentially the vertical direction in respect of the vehicle bottom.

3. A spindle drive, for an adjusting mechanism of a vehicle seat including a spindle (2) supported on an upper rail (1), connected with a seat cushion, where the spindle engages a drive nut (4) supported in respect of the vehicle bottom, with the spindle rotation caused by a drive (7) moving the upper rail (1) and the vehicle seat in the longitudinal direction of the spindle, characterized in that the upper rail (1) is guided in an axially sliding manner on the abutment surface (17) of the drive nut (4), where the upper rail (1) has a guide rail (24) which extends over the length of and runs in the longitudinal direction of said upper rail (1), which plunges into a corresponding longitudinal groove (23) in the drive nut (4), and which takes care of a lateral support of the upper rail (1) in the drive nut (4).

4. A spindle drive as claimed in claim 3, characterized in that the guide rail (24) is connected with the upper rail (1) in one piece.

5. A spindle drive as claimed in claim 4, characterized in that the guide rail (24) is formed out of the upper rail (1) by means of one of a cupping process, a casting process, an extrusion process and by a combination of such processes.

6. A spindle drive as claimed in claim 3, characterized in that the guide rail (24) is formed out of a separately shaped piece of slidable material which projects into a corresponding recess (23, 37) in at least one of the drive nut and upper rail (1), respectively.

7. A spindle drive as claimed in claim 3 characterized in that the guide rail (24) runs over the guide length of the upper rail (1) and is connected with the same and moves slidingly through a corresponding groove (23) in the drive nut (4).

8. A spindle drive as claimed in claim 7, characterized in that the guide rail (24) essentially extends over the length of the drive nut (4) and is firmly connected with the same and in that the upper rail runs with a corresponding longitudinal groove over the guide rail (24).

9. A spindle drive as claimed in claim 1 characterized in that the drive nut (4) is shaped out of plastic.

10. A spindle drive as claimed in claim 1 characterized in that the upper rail (1) is shaped out of aluminum.

11. A spindle drive as claimed in claim 1 characterized in that, in the horizontal direction and in the direction transverse to the longitudinal axis of the spindle, the drive nut is rotatably supported in respect of the vehicle bottom.

12. A spindle drive as claimed in claim 1 characterized in that the drive nut has pivots (12, 13) extending in the horizontal direction and in the direction transverse to a longitudinal axis of the spindle, by means of which pivots (12, 13) the drive nut (4) is rotatably supported in the horizontal direction and in the direction transverse to the longitudinal axis of the spindle in a cage (5) fastened to the vehicle bottom.

13. A spindle drive as claimed in claims 12, characterized in that front faces (19, 20) of the pivots (12, 13) support themselves horizontally and transversely to the longitudinal axis of the spindle on side walls (21, 22) of the upper rail (1).

14. A spindle drive as claimed in claim 13, characterized in that open ends of the side walls (21, 22) are provided with through projections (25, 26) in the direction of the spindle, said through projections (25, 26) essentially pointing in the direction of the central plane of the rail and reaching behind the peripheries of the pivots (12, 13) in order to prevent the upper rail (1) from moving away in a direction pointing away from the vehicle bottom.

15. A spindle drive as claimed in claim 14, characterized in that pivot ends rotatably supported in the cage (5) and projecting out of the cage have recesses (27, 28) extending parallel to the longitudinal axes of the pivots, with the projections (25, 26) of the side walls (21, 22) reaching behind at least one pivot.

16. A spindle drive as claimed in claim 14, characterized in that lugs are formed to the side walls (8, 9) of the cage (5), which lugs essentially extend in the same direction as the pivots (12, 13) and are engaged from behind by the projections (25, 26).

17. A spindle drive as claimed in claim 12 characterized in that the cage (5) is composed of at least two cage parts (14, 15) out of which at least one cage part is fastened to the vehicle bottom.

18. A spindle drive, for an adjusting mechanism of a vehicle seat including a spindle (2) supported on an upper rail (1), connected with a seat cushion, where the spindle engages a drive nut (4) supported in respect of the vehicle bottom, with the spindle rotation caused by a drive (7) moving the upper rail (1) and the vehicle seat in the longitudinal direction of the spindle, characterized in that the upper rail (1) is guided in an axially sliding manner on the abutment surface (17) of the drive nut (4), where the drive nut has pivots (12, 13) extending in the horizontal direction and in the direction transverse to a longitudinal axis of the spindle, by means of which pivots (12, 13) the drive nut (4) is rotatably supported in the horizontal direction and in the direction transverse to the longitudinal axis of the spindle in a cage (5) fastened to the vehicle bottom, where one side surface of the cage is shaped out of a lower rail (1) and in that the second side surface (9) is undetachably connected with the lower rail after the drive nut (4) has been inserted into the cage (5).

19. A spindle drive as claimed in claim 18, characterized in that the lower rail is not longer than triple the length of the drive nut (4).

20. A spindle drive for a vehicle seat adjusting mechanism comprising:

an upper rail supporting a vehicle seat cushion;

a drive nut fixedly supported on the vehicle;

a spindle rotatably supported in the upper rail;

drive means for rotating the spindle to move the upper rail and the vehicle seat in a longitudinal direction of the spindle; and an abutment surface formed on the drive nut, the upper rail axially sliding on the abutment surface, wherein the upper-rail has an inside surface which seats on the abutment surface of the drive nut, the inside surface and the abutment surface having recesses and projections, respectively, which correspond to one another, and which extend in the longitudinal direction of the spindle to form a guideway for the upper rail extending in the longitudinal direction of the spindle.

21. The spindle drive as claimed in claim 20 wherein:

the upper rail is supported on the abutment surface of the drive nut in a vertical direction with respect to a vehicle bottom.

22. A spindle drive for a vehicle seat adjusting mechanism comprising:

an upper rail supporting a vehicle seat cushion;

a drive nut fixedly supported on the vehicle;

a spindle rotatably supported in the upper rail;

drive means for rotating the spindle to move the upper rail and the vehicle seat in a longitudinal direction of the spindle;

an abutment surface formed on the drive nut, the upper rail axially sliding on the abutment surface; and a guide rail formed in the upper rail extending over the length of and in the longitudinal direction of said upper rail, the guide rail plunging into a corresponding longitudinal groove in the drive nut to provide lateral support of the upper rail in the drive nut.

23. The spindle drive as claimed in claim 22 wherein:

the guide rail is formed as a one piece, unitary member with the upper rail.

24. The spindle drive as claimed in claim 23 wherein:

the guide rail is formed out of the upper rail by means of one of a cupping process, a casting process, an extrusion process, and by a combination of same.

25. The spindle drive as claimed in claim 22 wherein:

the guide rail is formed out of a separately shaped piece of slidable material which projects into corresponding recesses formed in the drive nut and the upper rail, respectively.

26. The spindle drive as claimed in claim 22 wherein:

the guide rail extends over the guide length of the upper rail and is connected thereto and moves slidingly through a corresponding groove formed in the drive nut.

27. The spindle drive as claimed in claim 26 wherein:

the guide rail extends over the length of the drive nut and is firmly connected thereto, and a corresponding longitudinal groove is formed in the upper rail and receives the guide rail therein.

28. The spindle drive as claimed in claim 20 wherein:

the drive nut is shaped out of plastic.

29. The spindle drive as claimed in claim 20 wherein:

the upper rail is shaped out of aluminum.

30. The spindle drive as claimed in claim 20 wherein:

in the horizontal direction and in a direction transverse to the longitudinal axis of the spindle, the drive nut is rotatably supported with respect of a vehicle bottom.

31. The spindle drive as claimed in claim 20 further comprising:

pivots formed on the drive nut extending in the horizontal direction and in the direction transverse to the longitudinal axis of the spindle;

the pivots rotatably supporting the drive nut in the horizontal direction and in the direction transverse to the longitudinal axis of the spindle in a cage fastened to the vehicle bottom.

32. The spindle drive as claimed in claim 31 wherein:

front faces of the pivots are supported horizontally and transversely to the longitudinal axis of the spindle on side walls of the upper rail.

33. The spindle drive as claimed in claim 32 wherein:

open ends of the side walls are provided with through projections in the direction of the longitudinal axis of the spindle, the through projections pointing in the direction of a central plane of the upper rail and reaching behind the peripheries of the pivots to prevent the upper rail from moving away in a direction pointing away from the vehicle bottom.

34. The spindle drive as claimed in claim 33 wherein:

ends of the pivots are rotatably supported in the cage and have recesses projecting out of the cage and extending parallel to the longitudinal axes of the pivots, the projections of the side walls reaching behind at least one pivot.

35. The spindle drive as claimed in claim 33 further comprising:

lugs formed to side walls of the cage, the lugs extending in the same direction as the pivots and engaged from behind by the projections.

36. The spindle drive as claimed in claim 31 wherein:

the cage is formed of at least two cage parts, at least one cage part being fastened to the vehicle bottom.

37. A spindle drive for a vehicle seat adjusting mechanism comprising:

an upper rail supporting a vehicle seat cushion;

a drive nut fixedly supported on the vehicle;

a spindle rotatably supported in the upper rail;

drive means for rotating the spindle to move the upper rail and the vehicle seat in a longitudinal direction of the spindle;

an abutment surface formed on the drive nut, the upper rail axially sliding on the abutment surface;

pivots formed on the drive nut extending in the horizontal direction and in the direction transverse to the longitudinal axis of the spindle;

the pivots rotatably supporting the drive nut in the horizontal direction and in the direction transverse to the longitudinal axis of the spindle in a cage fastened to the vehicle bottom; and one side surface of the cage is shaped out of a lower rail and the second side surface is undetachably connected with the lower rail after the drive nut has been inserted into the cage.

38. The spindle drive as claimed in claim 37 wherein:

the lower rail is not longer than triple the length of the drive nut.

\* \* \* \* \*

UNITED STATES PATENT AND TRADEMARK OFFICE
CERTIFICATE OF CORRECTION

PATENT NO.    : 5,473,958
DATED         : December 12, 1995
INVENTOR(S)   : Horst Jeck and Hans G. Menne It is certified that error appears in the above-indentified patent and that said Letters Patent is hereby corrected as shown below:

Column 1, line 61, delete "thus".
Column 2, line 36, after "further,", insert --it is recommended that--.
Column 2, line 38, delete "is recommended".
Column 3, line 9, after "motion" insert --of--.
Column 3, line 45, after "motion" insert --of--.
Column 3, line 63, delete "left away" and insert --removed--.
Column 3, line 64, delete "an".
Column 4, lines 13 and 14, delete "(not illustrated in the drawing)".

Column 6, line 26, before "spindle", delete "a" and insert --an elongated, rotatable--.
Column 6, line 28, before "vehicle", delete "the" and insert --a--.
Column 6, line 32, before "abutment", delete "the" and insert --an--.
Column 6, line 33, delete "drive-nut (4)", second occurence.
Column 6, line 34, after "(17)", insert --of the drive nut (4)--.

UNITED STATES PATENT AND TRADEMARK OFFICE
CERTIFICATE OF CORRECTION

PATENT NO. : 5,473,958
DATED : December 12, 1995
INVENTOR(S) : Horst Jeck and Hans G. Menne It is certified that error appears in the above-indentified patent and that said Letters Patent is hereby corrected as shown below:

Column 6, line 34, after "and", insert --an inside surface of--.

Column 6, line 34, after "(1)", delete "inside surface, which".

Column 6, line 34, delete "seats itself" and insert --seated--.

Column 6, line 35, delete "same" and insert --drive nut--.

Column 6, line 42, before "vertical", delete "the" and insert --a--.

Column 6, line 45, before "spindle", delete "a" and insert --an elongated, rotatable--.

Column 6, line 47, before "vehicle", delete "the" and insert --a--.

Column 6, line 52, before "abutment", delete "the" and insetrt --an--.

Column 6, line 53, delete "the" and insert --a--.

Column 7, line 4, before "guide length", delete "the" and insert --a--.

Column 7, line 5, delete "same" and insert --upper rail--.

Column 7, line 9, before "length", delete "the" and insert --a--.

Column 7, line 10, delete "same" and insert --drive nut--.

Column 7, line 18, before "horizontal", delete "the" and insert --a--.

Column 7, line 18, before "direction", second occurrence, delete "the" and insert --a--.

Column 7, line 19, before "longitudinal" delete "the" and insert --a--.

Column 7, line 22, delete "the", second occurrence, and insert --a--.

Column 7, line 23, before "direction", second occurrence, delete "the" and insert --a--.

Column 7, lines 30-31, delete "support themselves" and insert --are supported--.

UNITED STATES PATENT AND TRADEMARK OFFICE
CERTIFICATE OF CORRECTION

PATENT NO. : 5,473,958
DATED : December 12, 1995
INVENTOR(S) : Horst Jeck and Hans G. Menne It is certified that error appears in the above-indentified patent and that said Letters Patent is hereby corrected as shown below:

Column 7, line 31, after "transversely", insert --with respect--.

Column 7, line 57, before "spindle", delete "a" and insert --an elongated, rotatable--.

Column 7, line 59, before "vehicle", delete "the" and insert --a--.

Column 7, line 64, before "abutment", delete "the" and insert --an--.

Column 7, line 65, before "horizontal", delete "the" and insert --a--.

Column 7, line 66, before "direction", second occurrence, delete "the" and insert --a--.

Column 8, line 5, before "second", delete "the" and insert --a--.

Column 8, line 9, delete "not longer than", and insert --at most equal to--.

Column 8, line 9, before "length", delete "the" and insert --a--.

Column 8, line 14, after "vehicle" insert --seat adjusting mechanism--.

Column 8, line 15, before "spindle", delete "a" and insert --an elongated--.

Column 8, line 18, after "seat", insert --cushion--.

Column 8, line 36, after "vehicle", insert --seat adjusting mechanism.--

Column 8, line 37, before "spindle", delete "a" and insert --an elongated--.

Column 8, line 40, after "seat", insert --cushion--.

Column 8, line 56, delete "same", and insert --the process--.

UNITED STATES PATENT AND TRADEMARK OFFICE
CERTIFICATE OF CORRECTION

PATENT NO. : 5,473,958

DATED : December 12, 1995

INVENTOR(S) : Horst Jeck and Hans G. Menne

It is certified that error appears in the above-indentified patent and that said Letters Patent is hereby corrected as shown below:

Column 8, line 63, before "guide length", delete "the", and insert --a--.

Column 9, line 1, before "length", delete "the", and insert --a--.

Column 9, line 10, before "horizontal", delete "the", and insert --a--.

Column 9, line 11, before "longitudinal", delete "the", and insert --a--.

Column 9, line 15, before "horizontal", delete "the", and insert --a--.

Column 9, line 16, before "direction", second occurrence, delete "the" and insert --a--.

Column 9, lines 16-17, before "longitudinal", delete "the" and insert --a--.

Column 9, line 20, after "fastened to", delete "the", and insert --a--.

Column 10, line 5, before "side", insert--the--.

Column 10, line 14, after "vehicle", insert --seat adjustment mechanism--.

Column 10, line 15, before "spindle", delete "a" and insert --an elongated--.

Column 10, line 17, after "seat" insert --cushion--.

Column 10, line 21, before "horizontal", delete "the", and insert --a--.

Column 10, line 22, before "direction", second occurrence, delete "the" and insert --a--.

UNITED STATES PATENT AND TRADEMARK OFFICE
CERTIFICATE OF CORRECTION

PATENT NO. : 5,473,958
DATED : December 12, 1995
INVENTOR(S) : Horst Jeck and Hans G. Menne It is certified that error appears in the above-indentified patent and that said Letters Patent is hereby corrected as shown below:

Column 10, lines 22-23, before "longitudinal", delete "the" and insert --a--.

Column 10, line 26, after "fastened to", delete "the" and insert --a--.

Column 10, line 28, before "shaped", delete "is".

Column 10, line 29, before "second", delete "the", and insert --a--.

Column 10, line 33, delete "not longer than", and insert --at most equal to--.

Column 10, line 33, before "length", delete "the" and insert --a--.

Signed and Sealed this

Second Day of July, 1996

Attest:

BRUCE LEHMAN

*Attesting Officer*  *Commissioner of Patents and Trademarks*